US 11,891,977 B2

(12) United States Patent
Ramde

(10) Patent No.: US 11,891,977 B2
(45) Date of Patent: Feb. 6, 2024

(54) SYSTEM FOR OFFSHORE POWER GENERATION

(71) Applicant: Roar Ramde, Åsgårdstrand (NO)

(72) Inventor: Roar Ramde, Åsgårdstrand (NO)

( * ) Notice: Subject to any disclaimer, the term of this patent is extended or adjusted under 35 U.S.C. 154(b) by 88 days.

(21) Appl. No.: 17/623,750

(22) PCT Filed: Jun. 25, 2020

(86) PCT No.: PCT/NO2020/050180
§ 371 (c)(1),
(2) Date: Dec. 29, 2021

(87) PCT Pub. No.: WO2021/002759
PCT Pub. Date: Jan. 7, 2021

(65) Prior Publication Data
US 2022/0268259 A1  Aug. 25, 2022

(30) Foreign Application Priority Data
Jul. 2, 2019   (NO) .................................. 20190831

(51) Int. Cl.
*F03D 13/25*  (2016.01)
*F03D 80/50*  (2016.01)
(Continued)

(52) U.S. Cl.
CPC ............. *F03D 13/25* (2016.05); *F03D 80/50* (2016.05); *E02B 2017/0091* (2013.01);
(Continued)

(58) Field of Classification Search
CPC .......... F03D 13/25; F03D 80/50; F03D 7/042; E02B 2017/0091; F05B 2240/93; F05B 2240/95; B63B 43/02; B63B 2035/446
See application file for complete search history.

(56) References Cited

U.S. PATENT DOCUMENTS 4,590,718 A    5/1986  Angeloff
4,630,996 A   12/1986  Masaki
(Continued)

FOREIGN PATENT DOCUMENTS

CN    107514340 A    12/2017
GB      2269138 A     2/1994
(Continued)

OTHER PUBLICATIONS

Norwegian Search Report dated Feb. 12, 2020 for Norwegian Patent Application No. 20190831.
(Continued)

*Primary Examiner* — Joseph Ortega
(74) *Attorney, Agent, or Firm* — Alix, Yale & Ristas, LLP

(57) ABSTRACT

An offshore power generating system has a buoyancy body shaped as a hull with a bow and aft end, and elongated mast extending up from the buoyancy body to the buoyancy body about a horizontal transverse axis. A rotor is supported in one end of the longitudinal mast for rotation about a horizontal axis. The buoyancy body is kept in position with the bow turning up into wind and incoming waves. Rotational support of the mast has a horizontal rotational axis through the center of gravity of the mast that lies in the center plane of the buoyancy body above the aft end when the buoyancy body lies in operational position in calm sea with the rotational axis of the rotational support of the mast orthogonal to the center plane of the buoyancy body. A method for on-board loading and commissioning of mast with installed rotor on-board a buoyancy body.

23 Claims, 5 Drawing Sheets

(51) Int. Cl.
  *E02B 17/00* (2006.01)
  *F03D 7/04* (2006.01)
(52) U.S. Cl.
  CPC .......... *F03D 7/042* (2013.01); *F05B 2240/93* (2013.01); *F05B 2240/95* (2013.01)

(56) References Cited

U.S. PATENT DOCUMENTS

| | | |
|---|---|---|
| 7,293,960 B2 | 11/2007 | Yamamoto et al. |
| 10,279,871 B2 | 5/2019 | Su |
| 2007/0138021 A1 | 6/2007 | Nicholson |
| 2012/0227652 A1 | 9/2012 | Ramde |
| 2012/0308358 A1 | 12/2012 | Hynne et al. |
| 2013/0051925 A1 | 2/2013 | Fosso et al. |
| 2018/0252205 A1* | 9/2018 | Barber .................... B63B 22/00 |
| 2020/0362825 A1* | 11/2020 | Barber .................... F03D 13/20 |
| 2021/0355917 A1* | 11/2021 | Olsen ...................... B63B 75/00 |

FOREIGN PATENT DOCUMENTS

| | | |
|---|---|---|
| JP | 59120788 A | 7/1984 |
| JP | 61275587 A | 12/1986 |
| WO | 02073032 A1 | 9/2002 |

OTHER PUBLICATIONS

International Search Report and Written Opinion dated Aug. 5, 2020 for International Patent Application No. PCT/NO2020/050180.
Extended European Search Report dated Jul. 5, 2023 for European Patent Application No. 20835116.3.

* cited by examiner

SYSTEM FOR OFFSHORE POWER GENERATION

BACKGROUND

The disclosed embodiments relate to a system for offshore power generation utilizing wind for generating power. The system comprises a mast with a wind turbine in a hinged installation on a floating buoyancy body.

More specifically the disclosure relates to an offshore power generating system comprising:
- a buoyancy body being a hull with a bow and an aft end;
- an elongated, aerodynamic designed mast projecting upwards from the buoyancy body, rotatably supported on the buoyancy body about a horizontal transverse axis;
- a rotor supported in one end of the elongated mast for rotation about a horizontal axis oriented in the longitudinal direction of the buoyancy body;
- an arrangement for keeping the buoyancy body in a position with the bow turning up into the wind and incoming waves.

Also disclosed is a method for on board loading and preparing the mast with installed rotor into operation on a buoyancy body.

It is known from floating wind turbines offshore utilizing known offshore installations and vessels as a base/platform. It is also known floating wind turbines which, by means of a hinge/an axis of rotation, enables a rotation of a wind turbine between a vertical and horizontal position to prepare for offshore commissioning, transport and maintenance. Furthermore, it is known to use counterweights such as ballast tanks, water tanks, etc. to assist pivoting a wind turbine to a vertical position and stabilizing in this upright position.

Furthermore, it is known floating wind turbines designed so that the waves of the sea surface affect the relative position of the wind turbine to the least possible extent, in order to utilize the energy of the wind in the best possible way. Something that is achieved by making the floating unit's, the buoyancy body's, contact surface with the sea surface as small as possible in order for the waves to, as far as possible, unhindered to pass the installation, with associated high weight load per contact surface area. The necessary buoyancy for carrying the unit is distributed to one or more uniform, or different, subsea bodies below the sea surface to be connected to a platform above the sea surface, with associated mast and wind turbine, for structures providing the least possible contact with the sea surface.

Various buoyancy bodies consist for example of one permanently anchored cylinder with a fixedly mounted/installed mast with a rotatable wind turbine, three cylinders wherein the mast is either located on one of the cylinders or located in the center of three cylinders, permanently anchored with 3-4 anchors distributed at intervals of 90-120°. Such fixed anchoring does not allow the buoyancy body, and thus the wind turbine, to rotate into the wind direction, whereupon the wind turbine itself must be equipped with rotating devices on top of the mast to control the wind turbine so that it turns up into the wind as the wind changes direction.

Buoyancy bodies with wind turbines on fixed mast, requires installation at still wind conditions by means of lifting tools requiring high power and high lifting height. When wind turbine and mast are installed on the buoyancy body in an upright, vertical position, the installation can be transported to desired location for anchoring and commissioning.

Masts of prior art has cylindrical cross section in order for the wind to attack the fixed anchored unit from all directions. This results in unnecessary strength and stability forces, or drag forces on the unit, which creates high turbulence in the air flow at the rear of where the wind hits the mast. This means that the propeller blades of the wind turbine must be mounted/installed on the wind side and thus be rigid, with associated large weight in order to avoid deformations of the propeller blades in strong wind.

Units with small contact surfaces to the sea surface will have a large weight load per unit area of the contact surface and therefore be sensitive to weight changes and lack the ability to withstand inclining forces from in strong wind or other external impacts. The load capacity is therefore limited and complicated by the need of fixed ballast to achieve the necessary righting moment. The survivability will also in other critical situations, such as leakages in the buoyancy body or collisions with floating objects, deteriorate or cease.

Transport of floating wind-power stations can provide major challenges.

Places with shallow costal conditions requires towing the masts in horizontal state due to the draft. The transport and installation of the wind-power plant requires installation in calm weather, at calm seas, whereby the construction also must be hydrostatically stable even in this state.

The existing units are permanently positioned with fixed anchors and not objects for purchase and sale, and without the possibility for moving to other positions. Or, a relocation to other positions can only be done by extensive operations and is very sensitive to weather.

Scaling up the production of floating wind turbines is achieved by increasing the number of units arranged in a pattern known from land and shallow coastal water. Such arrangements tend to have major environmental impact and will, for example, be a threat to bird populations, interference in the seabed by buried anchoring systems and power and signal cables will further have an impact on marine life and thus also the fishing industry. The required area will also be a hindrance for example the shipping traffic.

It is therefore a need for a method and a system to increase the capacity of such installations without the interventions in nature/seabed increasing correspondingly and where one simplifies and facilitates the opportunities for maintenance and simultaneously solving many of the challenges facing the technology of today.

US2007138021 shows a plurality of wind turbines arranged on a framework of a ship. The framework is supported by a shaft forming a hinged joint to the deck of the ship and has one or more counterweights connected to the shaft. The counterweight is used to rotate the framework with wind turbines between a horizontal and vertical position. The ship may be formed in order for the counterweight to be over or below the water surface when the framework is in vertical position.

GB2269138 A shows a barge for typically loading of ships or other heavy installations. The barge has a hull which may be totally submerged and where the barge is provided with means for stabilizing the hull when submerged. The barge has typically stabilizing spuds/tension legs at the side of the barge being anchored to the sea bed, and to ensure stability during ballasting and deballasting during submerging and raising of the hull. The submerging/raising is controlled by ballasting of tanks in the hull of the barge.

WO2014116185 A1 shows an offshore facility comprising a floating platform, for example a ship, with a plurality of wind turbines. The floating platform may be provided with ballast tanks for stabilizing offshore. The floating platform may be turned, or the wind turbines may be turned about their vertical axis to provide maximum exposure to the wind. A turret mooring system together with a propulsion system allows the offshore facility to make optimal use of the wind by rotating the offshore facility about the turret and rotate the wind turbines about their axis.

WO 02073032 A1 shows a floating wind power generation plant with a single point mooring system fixed to the sea floor whereupon the floating wind power generation plant can be rotated about. The floating plant has a plurality of wind power generation units disposed thereon.

SUMMARY OF THE INVENTION

In the further description of the invention, the following is meant by the terms used:

The term "wind turbine" is used to describe an entity utilizing the kinetic energy of the wind to produce power. The wind turbine comprises at least one wing rotatably arranged on a hub. The wind acts on the wing and puts this into a rotational motion. The wind turbine is usually arranged on a mast of a certain length, wherein the wind turbine itself is placed on the highest point of the mast. The wind turbine can also be arranged on other suitable units.

The term "mast" will in the following be used to describe a device contributing to the turbine itself being at the desired height above the water surface and the vessel.

The term "vertical position" will in the following be used to describe the mast being in an upraised position for normal operating position or normal working position. The term includes that the mast may be inclined in relation to the vertical plane, until about nine degrees in an aft slanted direction.

The term "buoyancy body" is used to describe the vessel on which the wind turbine is to be installed. The buoyancy body can take different shapes, however, in this document it shall essentially be formed as a ship's hull. The ship's hull shall take the form of sinusoidal water lines as known from the applicant's own U.S. Pat. No. 8,726,822 B1, wherein the aft end is extra wide in relation to other known ship form. The hull of sinusoidal water lines is characterized of being very stable, and able to operate in extreme weather condition without significantly affecting the operations.

The term "forward" is that side of the buoyancy body that is pointing forward into the wind direction, opposite of astern. This side usually has a shape that brakes the waves so that the water is pushed past and along the sides of the buoyancy body.

The term "astern" is that end of the buoyancy body that is intended to point backwards, in the direction of the wind, opposite to the forward.

The term "stem" is the planar or slightly convex surface transverse of the longitudinal direction of the buoyancy body and is that end of the buoyancy body which should generally point backwards and lie leeward of the wind direction. Also known as the transom stem of the ship.

The term "longitudinal position" is used to describe the buoyancy body from the side in longitudinal direction, bow and stem pointing in each direction.

Provided herein is a system for offshore power generation with a wind turbine arranged on top of a mast located on a buoyancy body.

Also provided is an offshore power generation system that can be easily relocated between locations.

Also provided is an offshore power generation system comprising a buoyancy body installed with a mast mounted with a wind turbine, wherein the mast mounted with a wind turbine can be guided between a normal working or operating position or different positions for on-board loading, survival and maintenance, regardless of location.

Also provided is a system enabling transport of an offshore power generating system comprising a buoyancy body installed with a mast mounted with a wind turbine, where the system can be transported between locations with mast with mounted wind turbine in horizontal position.

Also provided is a system enabling location independent maintenance of a wind turbine on a mast installed on a buoyancy body.

Further, the disclosed embodiments enable boarding of an operator on a buoyancy body with a wind turbine on a mast when wind turbine and mast is in both horizontal and normal operating position.

Also provided is a buoyancy body enabling dimensional increase of mast and wind turbine compared to the prior art without having to increase the dimensions of the buoyancy body accordingly due to the characteristics of the hull.

Also provided is a solution in which the lifting power of the vessel and its position in relation to the buoyancy of the vessel, as well as the center of gravity are such that the effect of the movement of the ship and motion characteristic is optimal and as small as possible.

Also provided is an anchoring system enabling automatically and/or controlled rotation of a buoyancy body in optimal direction relative to wind direction such that this is optimal with respect to the wind direction at any time.

Also provided is a system for wind turbine on a mast located on a buoyancy body, where the buoyancy body has sufficient volume with space for transformers, converters, rectifiers, control equipment, battery and other necessary equipment to process generated energy and energy storage.

Also provided is a mast for a wind turbine where the effect of the forces acting on the mast, and which may affect the flow conditions of the blades on the turbine itself, is eliminated or at least significantly reduced.

Also provided is a buoyancy body with a wind turbine on a mast being stable also in rough sea.

In a first aspect, an offshore power generating system comprises:
  a buoyancy body in the shape of a ship's hull with a bow and an aft end;
  an elongated, aerodynamically shaped mast designed to project upwards from the buoyancy body, rotatably supported on the buoyancy body about a horizontal transverse axis;
  a rotor supported in one end of the longitudinal mast for rotation about a horizontal axis oriented in the longitudinal direction of the buoyancy body;
  an arrangement for keeping the buoyancy body in a position with the bow turning up into the wind and incoming waves. The system is characterized in that the rotational support of the mast comprises a horizontal, transversally orientated rotational axis through the center of gravity of the mast, wherein the center of gravity of the mast lies in the center plane of the buoyancy body vertically above the aft end of the buoyancy body when the buoyancy body lies in operational position in calm sea, and where the rotational axis of the rotational support of the mast is orthogonal to the center plane of the buoyancy body.

The center of buoyancy of the buoyancy body lies in a point ¼ or less of the total length of the buoyancy body from the aft end of the buoyancy body. The shape of the buoyancy body in the horizontal plane can preferably be circumscribed by a triangle, where the buoyancy body has maximum width at the aft end. The shape of the buoyancy body can be defined by a compressive load on the surface in the order of 3-6 metric tonnes/m², preferably 4-5 metric tonnes/m², more preferably 4.5 metric tonnes/m² on the vertical projection of the buoyancy body on the surface with a block coefficient of about 0.35, wherein the block coefficient, given by the formula CB=V/L*B*T, where V is an underwater volume of the buoyancy body, L is the length of the buoyancy body, B is the maximum width of the buoyancy body, and T is the draft of the buoyancy body. The shape of the buoyancy body is defined by a draft corresponding to the significant wave height in the sea state for which it is designed.

The rotor comprises a wind turbine enclosed by an aerodynamically designed wind turbine housing mounted/installed on the mast. The wind turbine housing may further comprise a water ballast tank.

The mast comprises following mast positions; an operating position, an on board loading and maintenance position and a survival position. In normal operating position with the wings of the rotor in the vertical plane, the mast forms an angle a relative to vertical plane, where the angle a is 0-15 degrees, preferably between 6-12 degrees, most preferably 9 degrees, pointing astern from the buoyancy body. In the on-board loading and maintenance position the mast is with the wings of the rotor in the horizontal plane, the mast in survival position is with the wings of the rotor 45-50 degrees astern of the buoyancy body from the vertical plane.

The offshore power generating system comprises one or more devices for rotating the mast with wind turbine between different positions. The device for rotating the mast comprises rope means, winches and/or hydraulic cylinders on the foundation of the mast or in a well in the buoyancy body, where the rope means may comprise fiber rope, wire, chain, etc. and/or hydraulic actuators for adjusting or changing the positions of the mast.

Mast with rotor is temporarily locked in the operating position by a releasable restraint mechanism. The restraint mechanism comprises a plurality of hydraulically operated shear bolts arranged at the lower part of the mast foot.

Mast with rotor maintains approximate operating position by means of one or more dampening devices for maneuvering the mast for compensation of the pitch motions of the buoyancy body. One or more dampening devices comprises a unit for maneuvering of the mast, where the unit for maneuvering of the mast is controlled by a control unit receiving signals from sensors, e.g. wave sensors, wind sensors, etc., and where the control unit activates the dampening devices for maneuvering of the mast in order to maintain the mast in as stable operating position as possible. The unit for maneuvering the mast comprises hydraulic cylinders for compensating for the pitch motions of the buoyancy body.

A device for keeping the buoyancy body towards the wind comprises an anchoring system arranged at the bow of the buoyancy body and possible thrusters at least at the aft end of the buoyancy body.

The rotatable support of the mast is retained by at least one support stand placed aft on the buoyancy body. The support stands comprise at least one leg with an aerodynamic cross section anchored in the buoyancy body where the rotational support comprises a bearing housing arranged on top of the support stands.

The lower part of the mast in its normal operating position is arranged in a separate well in the hull of the buoyancy body. Devices for rotating the mast with the wind turbine between the various positions can also or in addition also be arranged in the well. The well may comprise the restraint mechanism.

In a second aspect, a method for on board loading and commissioning of mast with mounted rotor on-board in a buoyancy body comprises the following steps;
placing mast with rotor in horizontal on-board loading position placed on a movable rig on quay/land or on a floating unit on water;
the buoyancy body water ballasted for receiving the mast in which the buoyancy body is positioned adjacent the movable rig;
pumping out water ballast for weight transfer of mast with rotor.

Rotation of mast with rotor, with center of gravity in support, by means of known devices to desired positions of the mast; operating position, on-board and maintenance position or survival position.

The method further comprising the steps;
engaging a plurality of hydraulically operated shear bolts with the mast foot at normal operating position of the mast for locking the mast in the normal operating position; and
moving the hydraulic shear bolts out of the engagement with the mast foot, thereby activating a plurality of hydraulic cylinders to compensate the pitching motions of the buoyancy body, where the hydraulic cylinders are adjusting the angular positions of the mast to maintain the position of the mast relative to the horizontal plane at calm sea equivalent to +/−2-4 degrees of the normal operating position of the mast at calm sea; or
moving the hydraulic shear bolts out of engagements with the mast foot to maneuver the mast to desired position of the mast; the normal operating position, the loading and maintenance position and the survival position.

The offshore power generating system comprises an anchoring point forward the buoyancy body. This reduces, among other things, extensive interference with the seabed which is required at several anchoring points. The system can easily be connected to and from the bottom anchoring and easily moved between different locations. This is enhanced by the fact that the mast with mounted/installed wind turbine is pivotally arranged in the buoyancy body, whereby the mast can be further rotated between different positions between vertical and horizontal position of turbine blades irrespectively of location and that the buoyancy body is designed as a ship hull with low draft.

The mast is supported and connected with the buoyancy body aft on the buoyancy body and in operating position the mast slanting/inclining about 9 degrees aft. The propeller blades in operating position are parallel to the vertical plane. The position of the mast is closely related to the center of gravity of the buoyancy body, where the rotation of the buoyancy body's pitching movements occurs, in order to avoid coupling between rotation and vertical motions. If the mast had been placed mid-ships in the buoyancy body, the mast would, in addition to rotation, have experienced undesired vertical motions. An astern position of mast is also convenient when loading the mast onto the buoyancy body. In addition, a stronger, directional stabilizing moment for the buoyancy body is obtained by placing the wind turbine as far away from the turret/anchorage point as possible. The propeller blades, which, depending on their rotational position, are in the wind shadow because of the mast, get, because of the inclination of the mast, increased distance to the portion of the mast lying in front of the blades, and thus reduced influence of the wind shadow and the associated turbulence behind the mast. The positioning of the wind turbine housing at the mast top and that the mast may comprise a bend astern, can further increase the distance and reduce the effect. Further, the mast has different structure above and below the rotary shaft taking into account the inflow conditions of the wind of the propeller blades, where the mast above the rotary shaft has an aerodynamic profile reducing turbulence and the wind shadow of the propeller blades and the mast below the rotary shaft may allow for different design to take into account the strength conditions and vibration and/or oscillation phenomena.

The mast connects the wind turbine with the buoyancy body in a continuous structure whereby the mast foot is primarily firmly fixed to a well in the buoyancy body when in an upright operating position. When other positions are desired for service, maintenance, loading or unloading, or in survival position, the connection is loosened for maneuvering to a new desired position. The mast with fixed turbine is mainly rotated to operating position at on-board loading into the buoyancy body for transport to destination. Simple devices enable rotation of the mast for rotation and maneuvering the mast to desired positions even at destination. A movable rig, such as a barge, can be transported offshore to the power generating system to assist in, for example, service and maintenance operations so that the mast with the mounted/installed turbine can rest thereon.

The mast with permanently installed turbine can also be released from its fixed connection for maneuvering in order to maintain the propeller blades as close to the vertical plane as possible accounting for the pitching motions of the buoyancy body due to waves. When the fixed connection is released, passive and/or active dampening devices, such as hydraulic cylinders, water, springs etc. to reduce the pitching/heave angles of the mast relative to the pitching angles of the buoyancy body and thus maintain turbine production. If the pitching motions become too large due to large incoming waves, the electricity production can be reduced and possibly stopped by slowing down the rotation of the turbine blades.

The wind turbine housing may comprise a water ballast tank. The natural periods of rolling and pitching due to wave motions increase when the inertial radius of the platform increases. With appropriate weight in the wind turbine housing, with a large distance to the center of rotation, an increase of the natural periods is achieved, further away from the most frequent wave periods, which will give more operating hours. Solution with water ballast tank is possible due to the high stability of the platform.

The active and passive dampening devices can advantageably be placed in a well in the buoyancy body, preferably a closed well. A well, in opposite to the open deck, allows for a stable connection of the mast foot and a protective room for equipment for the maneuvering device of the mast. The well should not be open to sea but could be filled and emptied by the bilge and ballast system of the buoyancy body. With increased pitching/heave motions, the propeller can be exposed to no inflow of wind or perhaps opposite wind and will thus work as an engine and not a generator. By turning the mast in relation to the ship, by means of control and dampening devices at the mast foot, reduction and control over the pitching/heave angle is achieved. The ship itself can be a wave sensor, and by measuring the pitching/heave angle for incoming waves, further incoming waves can be predicted. From the instantaneous measured pitching/heave angle of the buoyancy body, acceptable waves can be filtered out and when a given limit is exceeded, a computer can activate the maneuvering unit so that the mast prepares for the expected incoming waves. The turbine will then be able to continue production even in rougher sea.

BRIEF DESCRIPTION OF THE DRAWINGS

Embodiments of the present invention will now be described in detail, with reference to the following diagrams wherein.

DETAILED DESCRIPTION

The following description of the exemplary embodiments of the present invention refers to the accompanying drawings. The same reference numbers in different drawings identify the same or similar elements. The following detailed description does not limit the invention or the scope of protection, as the scope of protection is defined by the person skilled in the art's interpretation of the scope of the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment.

Figure 1:
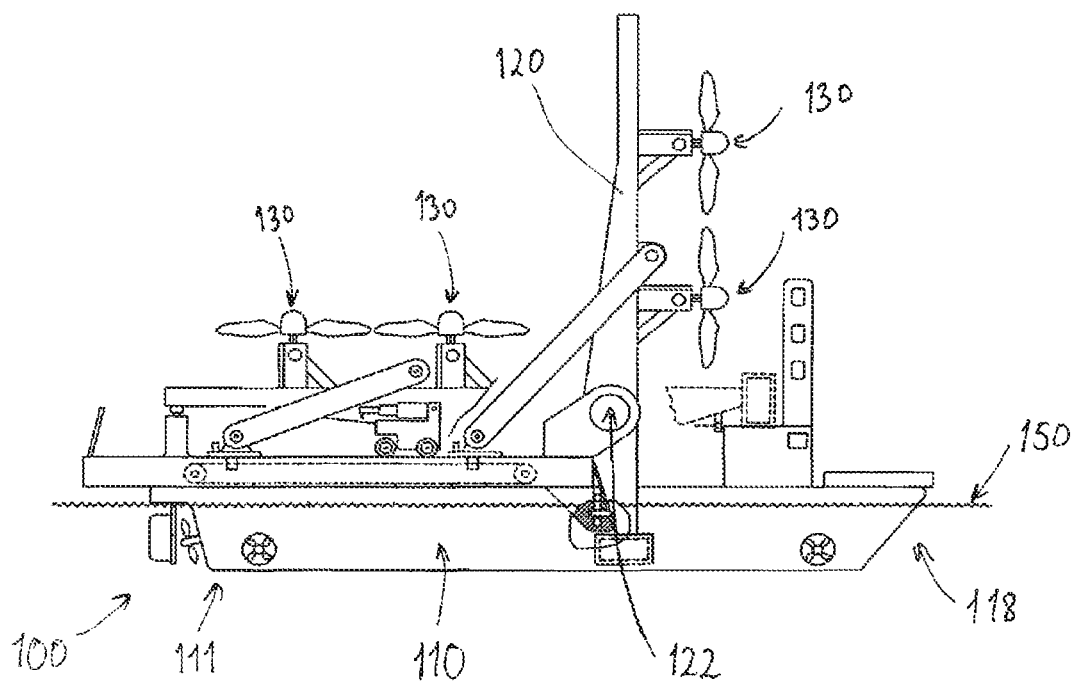
FIG. 1 shows prior art of wind turbines arranged on a frame on a ship.

FIG. 1 shows prior art of wind turbines arranged on a frame on a ship, as mentioned in US 2007138021, showing several wind turbines 130 arranged on a frame on a buoyancy body 110 here represented by a ship. The frame or the mast 140 is supported by a bearing housing 121 on the ship forming a hinged link to the ship deck 116 and has one or more counterweights connected to the shaft. The counterweight is used to rotate the frame 120 with wind turbines 130 between a horizontal and vertical position. The ship 130 may be designed so that the counterweight is above or below the water surface 120 when the frame is in vertical position.

Figure 2:
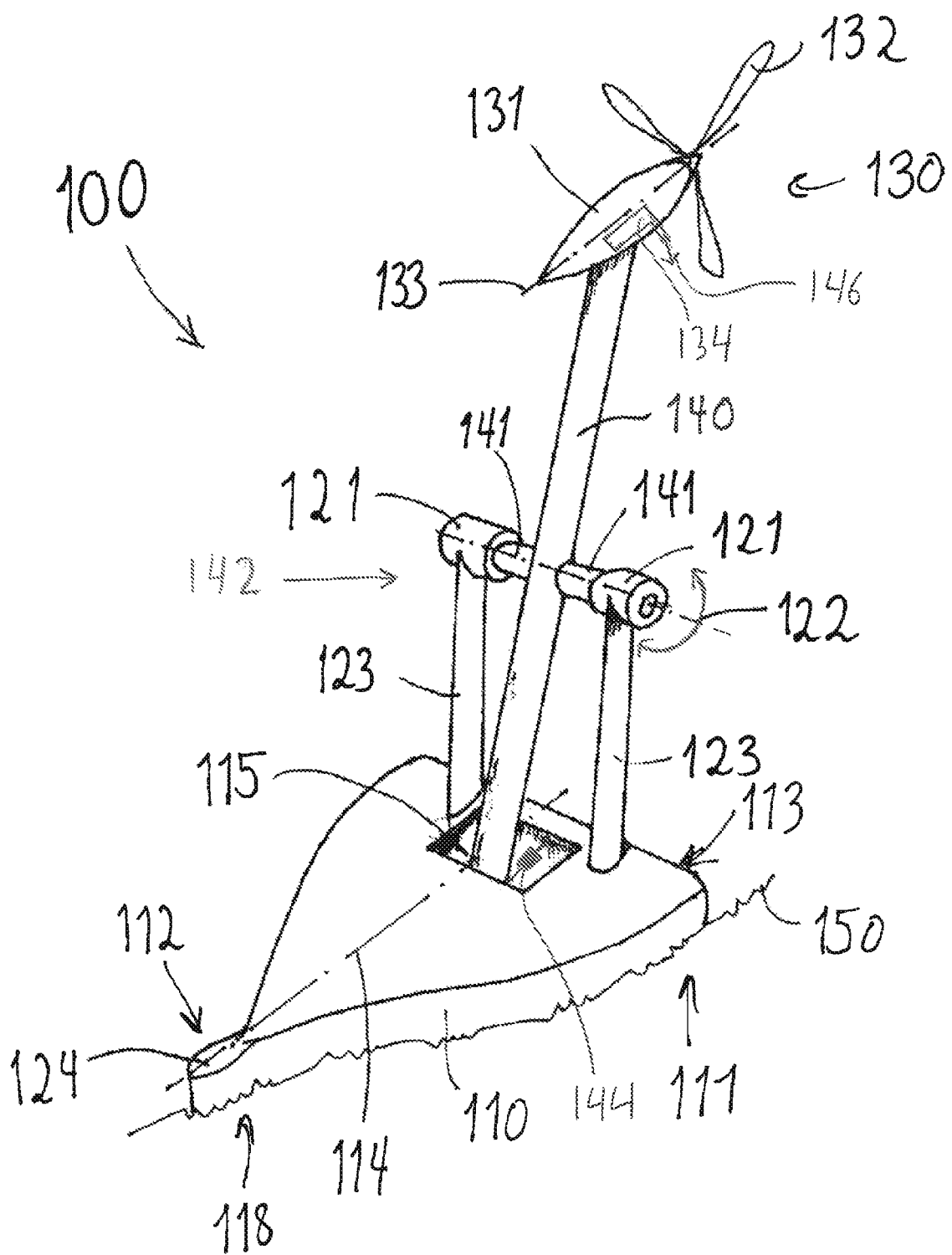
FIG. 2 shows schematically and in perspective one possible embodiment of a system for offshore power generation, where the system shows a buoyancy body with mounted/installed mast with a wind turbine in normal operating position.

FIG. 2 shows schematically and in perspective one possible embodiment of a system for offshore power generation 100. The system 100 shows a buoyancy body 110 at a sea surface 150 with mounted/installed mast 140 with a wind turbine 130 in normal operating position, inclined about 9 degrees astern. The mast 140 with wind turbine 130 mounted/installed in one end of the mast 140 whereby the opposite end of the mast 140 forms a mast foot located in a well 115. The well permits a stable attachment of the mast foot, as well a protected room for equipment for maneuvering, not shown, of the mast 115. It is not open to sea, not shown in the figure, and can be filled and emptied by the bilge and ballast system of the buoyancy body. The description on FIG. 4B below gives a more detailed description of the maneuvering equipment. The mast 140 can be rotated to achieve desired positions for normal operating position, on-board loading position, maintenance position and survival position respectively, further discussed in connection with FIG. 6B below. The wind turbine housing (131) may also include a water ballast tank (131).

The mast 140 is supported on the buoyancy body (110) in a rotatable arrangement (142) and rotates about an axis of rotation 122, which is at the center of gravity of the mast 140. The mast 140 is at this point mounted/installed on bearing shafts 141, which extend on either side of the mast 140. The bearing shafts 141 of the mast 140 are supported between two bearing housings 121 mounted/installed on two support stands 123 astern of the buoyancy body.

Figure 3A:
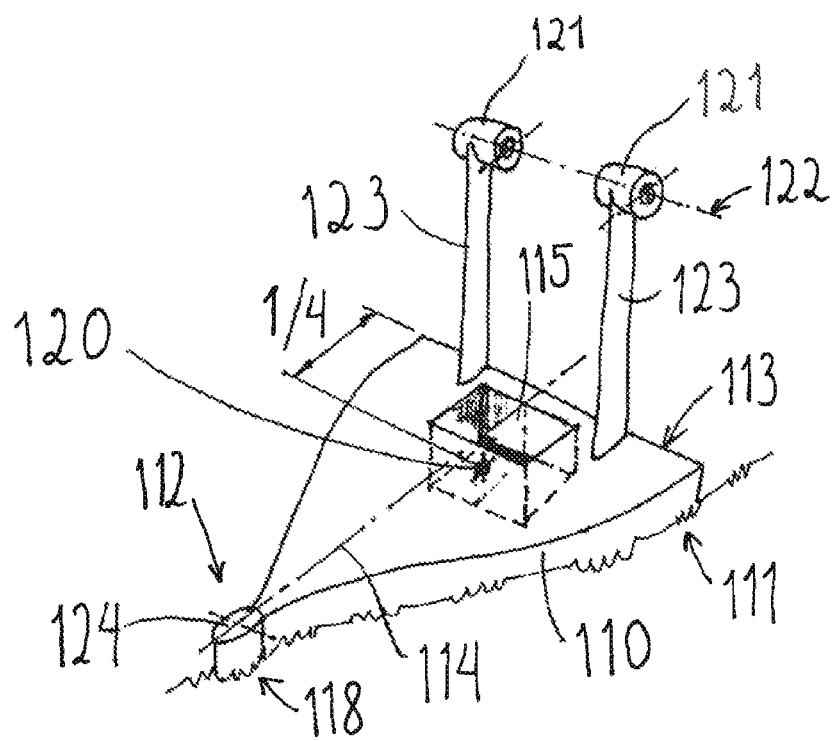
FIG. 3A shows schematically and in perspective one possible embodiment of the buoyancy body in a normal operating state.

FIG. 3A shows schematically a perspective of one embodiment of the buoyancy body 110 in a normal operating state. The buoyancy body 110 has an approximately triangular base shape with a wide stern 113 where a center of buoyancy 120 lies in a distance from the stern 113 of approximately ¼ or less of the length of the buoyancy body 110, and a contact surface with the sea 150 where the center of floatation 119 has a distance from the stern 113 of approximately ⅓ of the length of the buoyancy body 110, or less. The buoyancy body 110 is closest to the wind direction equipped with a single point anchoring system 124 known from the offshore industry. The anchoring system 124 provides for holding the buoyancy body 110 up into the wind and is preferably arranged at the bow of the buoyancy body 110, in addition, thrusters (145) arranged at the aft end 111 of the buoyancy body can further assist keeping the buoyancy body 110 up into the wind. The buoyancy body 110 is equipped with two symmetrically positioned support stands 123 astern with legs comprising aerodynamically shaped cross sections and with shared bearing housing 121 on the top forming a rotational axis 122 for the mast 140. The bearing housings 121 are installed with a common horizontal center line 122 perpendicular to the buoyancy body's center plane 114, at a height above the deck adapted to the purpose of the support stands 123 which, among other things, may be to receive offshore structures such as masts 140 with wind turbines 130.

FIG. 3A shows two support stands 123 protruding up and are approximately perpendicular to the buoyancy body 110 and the sea surface 150 at calm sea. The support stands 123 are not limited to protrude up in this direction, each of which may also project slanted from the buoyancy body 110. Each support stand 123 is further shown to comprise of a single strut, but each of them may also be combined with one or more slanted/inclined struts for stiffening the structure.

The buoyancy body's 110 contact with the energy-rich sea surface 150 is made large enough so that an irregular and a position variable energy distribution can be integrated by the horizontal area of the buoyancy body 110, so that the energy distribution of the waves below the buoyancy body 110 can be cancelled and the buoyancy body's 110 response on the existing forces thereby are reduced.

Figure 3B:
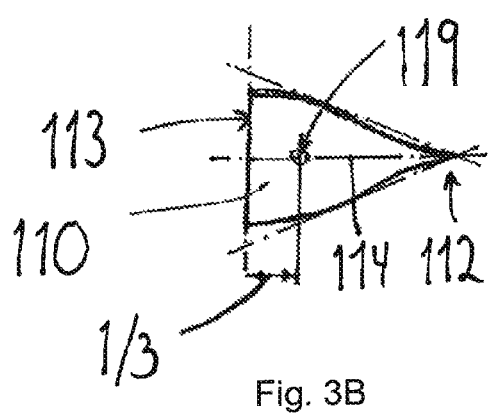
FIGS. 3B and 3C show schematic views of variants of a possible hull shape seen from above.
Figure 3C:
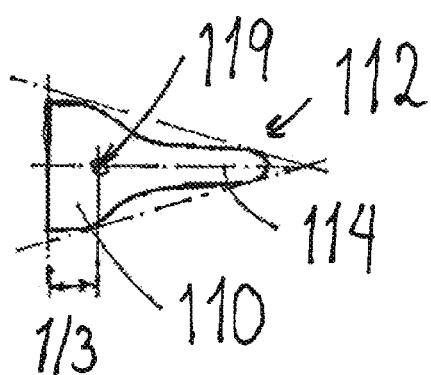

The size of the contact surface has a low weight load per area unit, typically about 3-4 metric tonnes/m², so that no problems with loading capacity, trim, stability and survivability will arise and will thus give the buoyancy body 110 a draft allowing docking at offshore ship yards and docking in existing dry docks. The contact surface between the buoyancy body 110 and the sea may assume different variants 10 of the base triangle where the desired location of the water line center of floatation 119 is fulfilled as shown in FIGS. 3B and 3C.

The shape of the buoyancy body 100 in the horizontal plane will influence the distribution of the buoyancy along the length L of the buoyancy body 110, which also will assume an approximate triangular shape, with the largest cross-sectional area close to the stem 113.

Figure 3D:
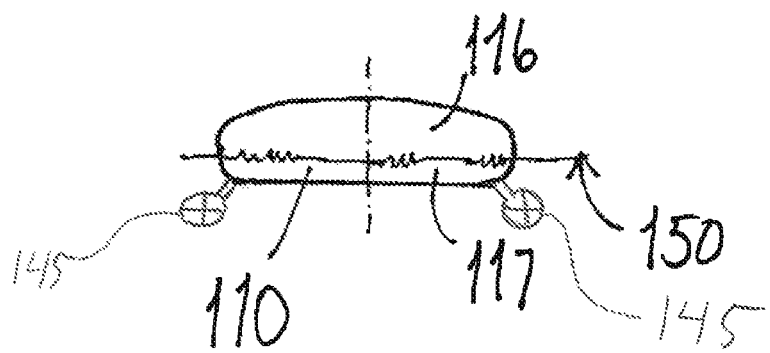
FIG. 3D shows schematically an advantageous cross section of the hull.

The sole purpose of the buoyancy body 110 is to support the wind turbine 130, and can, above the sea surface 150, instead of a conventional deck, be replaced by a super structure 116 shaped so that incoming sea is allowed to move away from the buoyancy body 110 and to excite as little motions as possible. The underwater hull 117 of the buoyancy body 110 has a shape adapted to the load of the waves upon which the super structure 116 can be shaped approximately similar to the underwater hull 117 with the keel pointing upwards, as shown in a cross section 11 in FIG. 3D. The super structure 116 takes the waves so that the hull gets less motions by the waves rolling over rather than colliding with a bow. This increases the survivability of the buoyancy body 110 by better tolerating the encounter with the waves.

The buoyancy body's 100 volume gives sufficient room for transformers, converters, rectifiers and control equipment to process the generating energy to a desired format and groups of battery for storage of energy, preferably located in the well 115 of the buoyancy body 110, other relevant, protecting locations on the deck of the buoyancy body are relevant locations.

Figure 4:
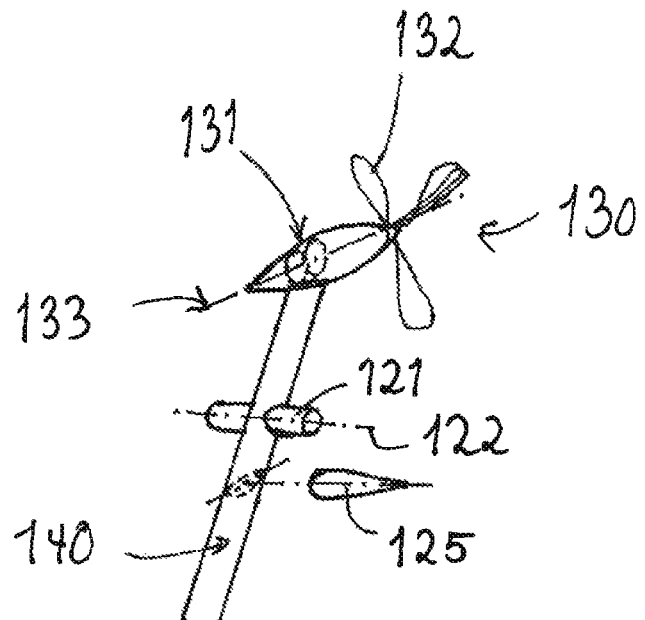
FIG. 4 shows schematically and in perspective a mast with a wind turbine designed for mounting on support stands.
Figure 5:
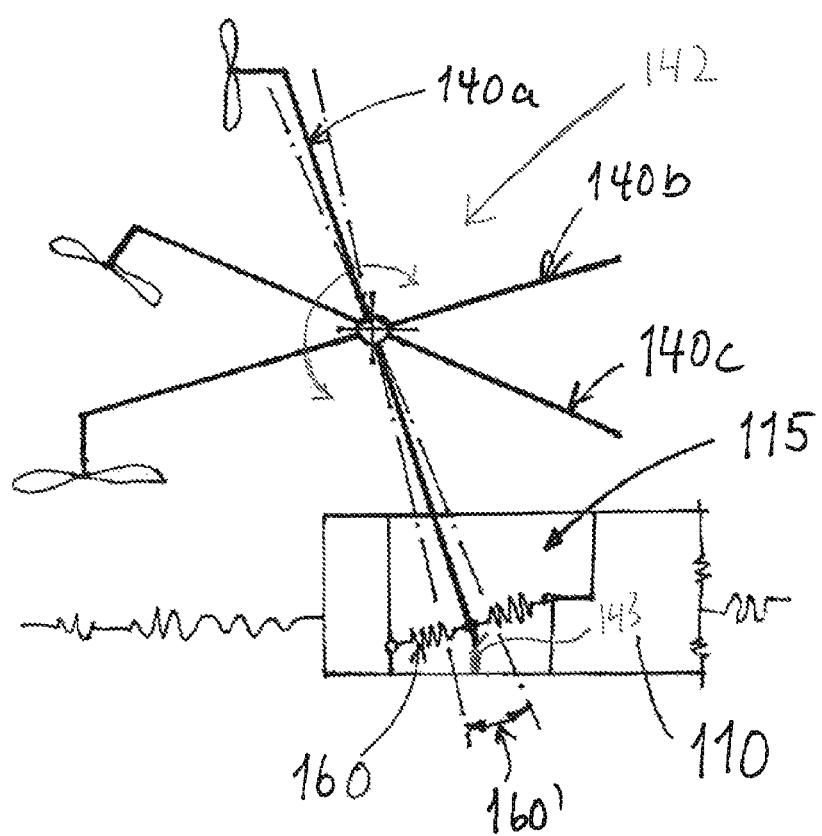
FIG. 5 shows schematically and in perspective a truncated longitudinal section in the center plane with the mast in different positions.

FIG. 4 shows a mast 140 with a wind turbine 130 designed for installation on the support stands 123. The mast 140 is preferably carried out in a light-weight material with an aerodynamic cross-section 125 as shown in FIG. 4B and with a wind turbine 130 installed, with an integrated cylindrical wind turbine housing 131 arranged on the top of the mast, so that the resistance in the wind streams are minimized. The mast 140 is, approximately at half of its height, in the mass center of gravity, in the horizontal plane and perpendicular to the center plane, installed with a cylindrical support bearing shaft 141 for support in the bearing housing 121 of the support stands 123, the support bearing shaft 141 projecting preferably out on each side of the mast 140. The mast foot is installed with fixing devices for maneuvering and or dampening of the mast and the pendulum movements of the mast and possibly brake plates for that incident when lower end of the mast is submerged in water in a well at the aft part of the vessel, to reduce angular movements about the rotational axis 122 of the mast. The well 115 may be separated from the surrounding sea so that also the volume of the well contributes to the buoyancy and stability corresponding to a tank on-board the vessel. The mast 140 with the wind turbine 130 is balanced about the rotational axis 122 so that it in installed position on the buoyancy body 110, easily may be rotated to desired positions for different purposes. The well 115 may be air-filled and the dampening devices may be a suitable releasable suspension system, FIG. 5 shows a longitudinal section in the center plane with the mast 140 in different positions 140a, 140b, 140c rotated about the rotational axis in the bearing housing 121. The mast 140 in normal operational position is indicated at 140a, on-board loading and maintenance position 140b, and survival position 140c. In all these positions the mast 140 with the wind turbine 130 will keep its mass center of gravity in the rotational axis 122, whereby the maneuvering of the mast 140 to the different positions 140a, 140b, 140c can be performed with suitable, known devices. To reduce undesired angular motions in the vertical plane, which the mast can have in certain wave conditions, and that disturbs the production of the wind turbine 130, the foot of the mast 140 is connected in the vertical plane of the buoyancy body 110 with suitable passive and/or active dampening devices 160. The well 115 may also be filled with sea water so that the brake plates which may be arranged on the mast foot may further contribute to the dampening. The relative dampening of the mast 140 relative to the unit's total angular deflection can be controlled by a control unit (not shown). A plurality of hydraulic cylinders (144) can act as dampening means 160. These can be actuated to compensate for pitch motions of the buoyancy body 110, where the hydraulic cylinders (144) adjust the angular position 160' to maintain the mast 140 in position relative to the horizontal plane at calm sea corresponding to +/-2-4 degrees of the normal operating position 140a at calm sea. When the mast is in normal operating position 140a slanting/declining 9 degrees astern, the turbine housing of the wind turbine 130 is parallel to the horizontal plane, while the wings 132 of the wind turbine 130 are parallel with the vertical plane. When the buoyancy body 110 is not subjected to pitching motions, the mast 140 will temporarily be held in normal operating position 140a by releasable restraint mechanisms. These restraint mechanisms may preferably comprise one or more hydraulically operated shear bolts (143) disposed in the well 115 at the mast foot at the lower part of the mast 140.

In the on-board loading position 140b, the mast 140 inclines a further 90 degrees astern from normal operating position 140a, the wings 132 lying parallel to the horizontal plane. In the maintenance and survival position 140c the mast 140 inclines 45-50 degrees from normal operating position 140a. Mast 140 with wind turbine 130 maintains approximately normal operating position 140a by means of one or more dampening devices 190 for maneuvering of the mast 140 to compensate for heave/pitching motions of the buoyancy body 110. The dampening devices will comprise a unit for maneuvering the mast, which is controlled by a control unit receiving signals from sensors, for example wave sensors, wind sensors, etc. The control unit will activate the dampening devices to maneuver the mast in order to maintain the mast in as stable operating position 140a as possible. The unit for maneuvering the mast may comprise hydraulic cylinders (144) to compensate for pitching/heave motions of the buoyancy body.

Figure 6A:
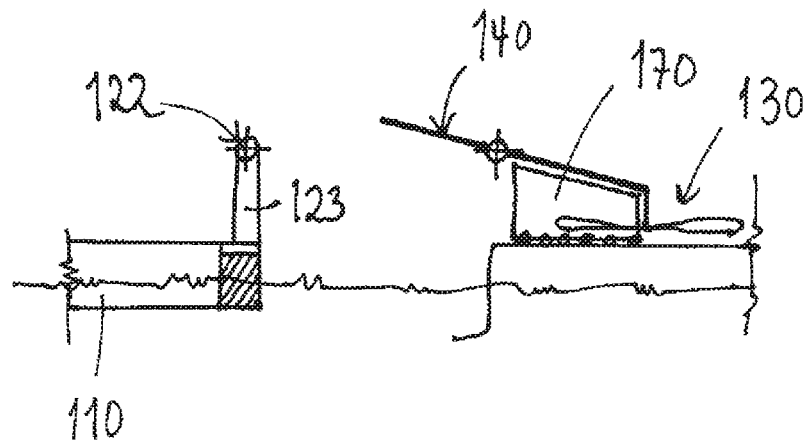
FIGS. 6A-6C shows schematically possible steps in a method for on-board loading of a mast with a wind turbine.
Figure 6B:
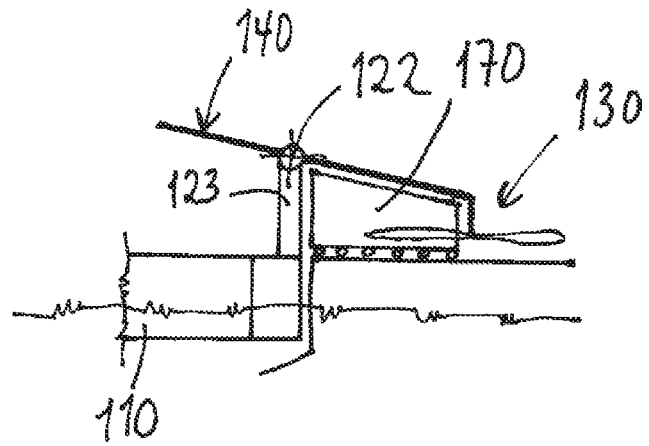
Figure 6C:
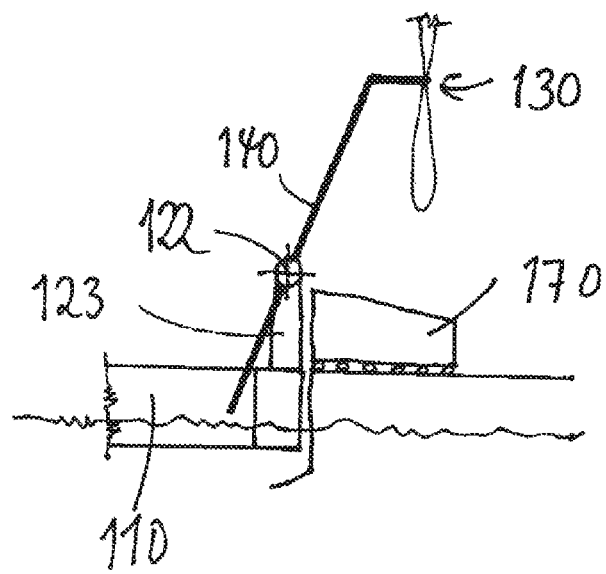

FIGS. 6A-6C show on-board loading of a mast 140 with wind turbine. Mast 140 is in on-board loading position 140b on suitable movable rig 170 either in the form of a movable rig 170 floating at sea, for example a barge, or a movable rig 170 standing ashore. For preparation for on-board loading, as shown in FIG. 6A, mast 140 with wind turbine 130 with wings 132 in horizontal position on a movable rig 170 with the buoyancy body 110 ballasted and positioned adjacent the movable rig 170 for receiving the bearing shaft 141 of the mast 140 in the bearing housing 121 of the support stands 123. Weight transfer of mast 140 with wind turbine 130, as shown in FIG. 6B, is effected by pumping out water ballast (146). Mast 140 with wind turbine 130, balanced and with center of gravity in the bearing at the shafts 141, is rotated with suitable, known devices to the desired position, normal operating position 140a as shown in FIG. 6C.

The mast 140 with wind turbine 130 is held in normal operating position by engaging the retaining mechanism with the mast foot, whereby the retaining mechanism preferably comprises hydraulically operated shear bolts (143). To compensate for pitching motions of the buoyancy body 110, the restraint mechanism is brought out of engagement with the mast foot, whereby activating dampening devices, preferably comprising a given number of hydraulic cylinders (144), are being activated.

The mast 140 can be maneuvered by moving the retaining mechanism out of engagement with the mast foot and by known devices the mast can be maneuvered to desired mast positions; operating position 140a, on-board loading and maintenance position 140b, and survival position 140c.

TABLE 1

| | |
|---|---|
| 100 | Offshore power generating system |
| 110 | Buoyancy body |
| 111 | Aft end |
| 112 | Bow or stern |
| 113 | Stern |
| 114 | Centre plan of the buoyancy body |
| 115 | Well |
| 116 | Super structure |
| 117 | Underwater hull |
| 118 | Forward |
| 119 | Center of floatation |
| 120 | Center of buoyancy |
| 121 | Bearing housing |
| 122 | The rotational axis 122 of the mast in the horizontal plane |
| 123 | Support stand |
| 124 | Anchoring system/point |
| 125 | Aerodynamic cross section of the mast |
| 130 | Wind turbine/rotor |
| 131 | Wind turbine hosing |
| 132 | Wing |
| 133 | The rotational axis of the wind turbine |
| 140 | Mast |
| 140a | Mast in normal operating position |
| 140b | Mast in on-board loading and maintenance position |
| 140c | Mast in survival position |
| 141 | The bearing shaft of the mast |
| 150 | Sea surface |
| 160 | Dampening devices |
| 160' | Angular positions |

The invention claimed is:

1. An offshore power generating system (100), comprising:
    a buoyancy body (110) having a shape of a hull and a length between a bow (112) and an aft end (111);
    an elongated mast (140) extending upwards from the buoyancy body (110) and supported on the buoyancy body (110) in a rotatable arrangement (142) about a horizontal transverse axis (122);
    a rotor supported in one end of the longitudinal mast (140) for rotation about a horizontal axis oriented in the length direction of the buoyancy body (110);
    an arrangement for keeping the buoyancy body (110) in a position with the bow (112) turning up towards the wind and incoming waves, wherein
    a rotational support of the mast (140) comprises a horizontal, transversally orientated rotational axis (122) through a center of gravity of the mast (140), wherein the center of gravity of the mast (140) lies in a center plane (114) of the buoyancy body (110) vertically above the aft end (111) of the buoyancy body (110) when the buoyancy body (110) lies in an operational position in calm sea, and where the rotational axis (122)

of the rotational support of the mast (140) is orthogonal to the center plane (114) of the buoyancy body (110), and a center of buoyancy (120) of the buoyancy body (110) lies in a point at a length position that is no greater than 25% of the length of the buoyancy body (110) from the aft end (111) of the buoyancy body (110).

2. The offshore power generating system (100) according to claim 1, wherein the shape of the buoyancy body (110) in the horizontal plane can be circumscribed by a triangle, and the buoyancy body (110) has a maximum width at the aft end (111).

3. The offshore power generating system (100) according to claim 2, wherein the shape of the buoyancy body is defined by a compressive load on the surface in the order of 3-6 metric tons/m² on the vertical projection of the buoyancy body (110) on the surface with a block coefficient of approximately 0.35, wherein the block coefficient is given by the formula:

$$CB = V/L*B*T, \text{ wherein}$$

V is an underwater volume of the buoyancy body (110),
L is the length of the buoyancy body (110),
B is the maximum width of the buoyancy body (110), and
T is the draft of the buoyancy body.

4. The offshore power generating system (100) according to claim 1, wherein the shape of the buoyancy body (110) is defined by a draft corresponding to a significant wave height in the sea state for which it is designed.

5. The offshore power generating system (100) according to claim 1, wherein the rotor comprises a wind turbine (130) enclosed by a wind turbine housing (131) having aerodynamic properties mounted on the mast (140).

6. The offshore power generating system (100) according to claim 5, wherein the wind turbine housing (131) further comprises a water ballast tank (131).

7. The offshore power generating system (100) according to claim 1, wherein the mast is movable between an operating position (140a), an on-board loading and maintenance position (140b), and a survival position (140c).

8. The offshore power generating system (100) according to claim 7, wherein, in the operating position, the mast (140) with the rotor and the wings of the rotor in a vertical plane form an angle a relative to the vertical plane of between 0 and 15 degrees pointing astern from the buoyancy body.

9. The offshore power generating system (100) according to claim 7, wherein, in the on-board loading and maintenance position (140b), the mast (140) and the wings (132) of the rotor are in a horizontal plane, and in survival position (140c), the mast (140) and the wings (132) of the rotor are 45-50 degrees astern from the buoyancy body relative to a vertical plane.

10. The offshore power generating system (100) according to claim 1, wherein the offshore power generating system (110) comprises one or more devices for rotating the mast (140) with wind turbine (130) between different positions (140a-c), wherein the device for rotating the mast (140) comprises one or more of rope means, winches and hydraulic cylinders (144) on the foundation of the mast (140), the rope means comprising fiber rope, wire or chain, or hydraulic actuators for adjusting or changing the positions (140a-c) of the mast (140).

11. The offshore power generating system (100) according to claim 1, wherein the mast (140) with the rotor is temporarily lockable in the operating position (140a) by a releasable restraint mechanism.

12. The offshore power generating system (110) according to claim 11, wherein the restraint mechanism comprises a plurality of hydraulically operated shear bolts (143) arranged at the lower part of the mast foot.

13. An offshore power generating system (100), comprising:

a buoyancy body (110) having a shape of a hull and a length between a bow (112) and an aft end (111);

an elongated mast (140) extending upwards from the buoyancy body (110) and supported on the buoyancy body (110) in a rotatable arrangement (142) about a horizontal transverse axis (122);

a rotor supported in one end of the longitudinal mast (140) for rotation about a horizontal axis oriented in the length direction of the buoyancy body (110);

an arrangement for keeping the buoyancy body (110) in a position with the bow (112) turning up towards the wind and incoming waves, wherein a rotational support of the mast (140) comprises a horizontal, transversally orientated rotational axis (122) through a center of gravity of the mast (140), wherein the center of gravity of the mast (140) lies in a center plane (114) of the buoyancy body (110) vertically above the aft end (111) of the buoyancy body (110) when the buoyancy body (110) lies in an operational position in calm sea, and where the rotational axis (122) of the rotational support of the mast (140) is orthogonal to the center plane (114) of the buoyancy body (110), and the mast with the rotor maintains approximate operating position (140a) by one or more dampening devices (160) for maneuvering the mast (140) for compensation of the pitch motions of the buoyancy body (110).

14. The offshore power generating system (100) according to claim 13, wherein at least one of the one or more dampening devices comprises a unit for maneuvering of the mast (140), the unit for maneuvering of the mast (140) being controlled by a control unit receiving signals from sensors, wherein the control unit is configured to activate the dampening devices (160) for maneuvering of the mast (140) to maintain the mast (140) in as stable operating position (140a) as possible.

15. The offshore power generating system (100) according to claim 14, wherein the unit for maneuvering the mast (140) comprises hydraulic cylinders (144) for compensating pitch motions of the buoyancy body (110).

16. The offshore power generating system (100) according to claim 1, wherein the device for keeping the buoyancy body (110) towards the wind comprises an anchoring system arranged at the bow (112) of the buoyancy body (110) and optionally thrusters (145) at least at the aft end (111) of the buoyancy body (110).

17. The offshore power generating system (100) according to claim 1, where a pivotal support of the mast (140) is retained by at least one support stand (123) placed astern of the buoyancy body (100), where the support stands (123) comprise at least one leg with an aerodynamic cross section anchored in the buoyancy body (110) where the rotational support comprises a bearing housing (121) arranged on top of the support stands (123).

18. The offshore power generating system (100) according to claim 7, wherein the lower part of the mast (140) in a normal operating position (140a) is in a separate well (115) in the hull of the buoyancy body (110).

19. The offshore power generating system (100) according to claim 10, wherein the devices for rotating the mast (140) with the wind turbine (130) between different positions (140*a-c*) is in a separate well (115) in the hull of the buoyancy body (110).

20. The offshore power generating system (100) according to claim 18, wherein the well (115) comprises the restraint mechanism.

21. A method for on-board loading and commissioning of a mast (140) with a mounted rotor on-board in a buoyancy body (110), comprising the steps of:
    placing the mast (140) with the rotor in a horizontal on-board loading position (140*b*) on a movable rig (170) on a quay, ashore or on a floating unit on water, the buoyancy body (110) ballasted with water for receiving the mast (140) in which the buoyancy body (110) is positioned adjacent the movable rig (170);
    pumping out water ballast (146) for weight transfer of the mast (140) with the rotor; and
    rotating the mast (140) with the rotor, with center of gravity in support, to different positions of the mast selected from a normal operating position (140*a*), on-board and maintenance position (140*b*), and survival position (140*c*).

22. The method according to claim 21, further comprising the steps of:
    engaging a plurality of hydraulically operated shear bolts (143) with the mast foot at the normal operating position (140*a*) of the mast (140) to lock the mast (140) in the normal operating position (140*a*); and
    moving the hydraulic shear bolts (143) out of the engagement with the mast foot, thereby activating a plurality of hydraulic cylinders (144) to compensate the pitching motions of the buoyancy body (110), wherein the hydraulic cylinders (144) adjust angular positions (160') of the mast (140) to maintain the position of the mast (140) relative to the horizontal plane at calm sea within 2-4 degrees of the normal operating position (140*a*) of the mast (140) at calm sea; or
    moving the hydraulic shear bolts (143) out of engagements with the mast foot to maneuver the mast (140) to a desired position of the mast (140) between the normal operating position (140*a*), loading and maintenance position (140*b*) and survival position (140*c*).

23. The offshore power generating system (100) according to claim 1, wherein the mast with the rotor maintains approximate operating position (140*a*) by one or more dampening devices (160) for maneuvering the mast (140) for compensation of the pitch motions of the buoyancy body (110).

\* \* \* \* \*